(12) United States Patent
Suzuki

(10) Patent No.: US 6,313,745 B1
(45) Date of Patent: Nov. 6, 2001

(54) SYSTEM AND METHOD FOR FITTING ROOM MERCHANDISE ITEM RECOGNITION USING WIRELESS TAG

(75) Inventor: Hikaru Suzuki, Gunma-machi (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/479,307

(22) Filed: Jan. 6, 2000

(51) Int. Cl.⁷ .................................................. G08B 13/14
(52) U.S. Cl. .................................. 340/572.1; 340/568.1; 340/568.5
(58) Field of Search .............................. 340/568.1, 568.5, 340/568.6, 572.1, 572.8, 825.35, 826.31, 10.41; 235/383, 385

(56) References Cited

U.S. PATENT DOCUMENTS

| | | | |
|---|---|---|---|
| 4,833,609 | 5/1989 | Grulke, Jr. ............................. | 705/20 |
| 5,424,524 | 6/1995 | Ruppert et al. ......................... | 705/8 |
| 5,504,675 | 4/1996 | Cragun et al. .................. | 340/825.33 |
| 5,521,364 | 5/1996 | Kimura et al. ...................... | 234/383 |
| 5,528,222 | 6/1996 | Moskowitz et al. .............. | 340/572.7 |
| 5,557,088 | * 9/1996 | Shimizu et al. ...................... | 235/383 |
| 5,572,653 | 11/1996 | DeTemple et al. ............. | 340/825.72 |
| 5,631,631 | 5/1997 | Deschenes ........................ | 340/572.1 |
| 5,632,010 | 5/1997 | Briechle et al. ......................... | 345/1 |
| 5,665,951 | 9/1997 | Newman et al. ..................... | 235/375 |
| 5,729,697 | * 3/1998 | Schkolnick et al. ................... | 705/23 |
| 5,736,967 | 4/1998 | Kayser et al. ........................... | 345/1 |
| 5,774,569 | 6/1998 | Waldenmaier ...................... | 382/100 |
| 5,955,951 | * 9/1999 | Wisxherop et al. ............. | 340/572.8 |
| 5,963,134 | * 10/1999 | Bowers et al. .................... | 340/572.1 |
| 5,979,757 | * 11/1999 | Tracy et al. .......................... | 235/383 |
| 6,032,127 | * 2/2000 | Schkolnick et al. .................... | 705/23 |
| 6,078,251 | * 6/2000 | Landt et al. ....................... | 340/572.1 |
| 6,084,528 | * 7/2000 | Beach et al. ..................... | 340/825.35 |

FOREIGN PATENT DOCUMENTS

| | | |
|---|---|---|
| WO 97/29452 | 8/1997 | (WO) . |
| WO 98/40832 | 9/1998 | (WO) . |
| WO 00/17793 | 3/2000 | (WO) . |
| WO 00/17992 | 3/2000 | (WO) . |

* cited by examiner

*Primary Examiner*—Van T. Trieu
(74) *Attorney, Agent, or Firm*—Christie, Parker & Hale, LLP

(57) ABSTRACT

A system and method for tracking and recognizing merchandise items taken into a fitting room by a customer for providing more efficient customer assistance. Each merchandise item is attached to a wireless tag including a product identifier. A fitting room is equipped with an antenna/receiver unit which interruates the wireless tag of an item taken into the fitting room to be tried-on. A store server retrieves information about the item based on the product identifier, and presents such information to a store clerk through an in-store terminal. In addition, the server develops recommendation of other products that the customer might be interested based upon the items taken into the fitting room. The server includes an analysis and recommendation engine that analyses the style, color, and brand of each of the items in the fitting room, and develops recommendations accordingly. The server presents the recommendations to a store clerk via the in-store terminal. If the customer possesses a customer ID card, the recommendation information is also based on the customer's profile and past trial and purchase history information. An employee ID card or tag also allows the system to track employees assisting the customers.

39 Claims, 9 Drawing Sheets

FIG. 4

| PRODUCT ID | SKU | PRODUCT NAME | STYLE CODE | COLOR | SIZE | DESCRIPTION |
|---|---|---|---|---|---|---|
| | | | | | | |

```
WOMEN'S APPAREL ——200a
    CASUAL WEAR ——202a
    204a——T-SHIRTS (STYLE CODE)——206a
        SKU 1 ——208
            NAME——208a
            PRICE——208b
            AVAILABLE COLORS——208c
            AVAILABLE SIZES——208d
        SKU 2
            ⋮

204b——SHORTS (STYLE CODE)——206b
        SKU 3
            NAME
            PRICE
            AVAILABLE COLORS
            AVAILABLE SIZES
        SKU 4
            ⋮

DRESSES——202b
        ⋮

MEN'S APPAREL——200b
    ⋮
```

FIG. 9

| TRIAL HISTORY | |
|---|---|
| DATE AND TIME | —72 |
| FITTING ROOM NO. | —74 |
| STORE CLERK ID(OPTIONAL) | —76 |
| PRODUCT ID 1 / PURCHASED(Y/N) | —78 |
| PRODUCT ID 2 / PURCHASED(Y/N) | |
| ⋮ | |
| DATE AND TIME | |
| FITTING ROOM NO. | |
| STORE CLERK ID(OPTIONAL) | |
| PRODUCT ID 1 / PURCHASED(Y/N) | |
| PRODUCT ID 2 / PURCHASED(Y/N) | |
| ⋮ | |

(Outer box labeled —70)

SYSTEM AND METHOD FOR FITTING ROOM MERCHANDISE ITEM RECOGNITION USING WIRELESS TAG

FIELD OF THE INVENTION

The present invention relates generally to electronic item tracking systems for use in retail facilities, and more particularly, to a system and method of tracking and recognizing merchandise items carried into a fitting room by a customer for providing more efficient customer assistance.

BACKGROUND OF THE INVENTION

In a typical retail facility, a store clerk's main role is to aid customers in making a purchasing decision. In most occasions, a customer enters a retail facility with only a vague idea of an item that the individual wants to purchase. The store clerk encountering such a customer has the task of asking questions that will help clarify features that the customer wants in the item, as well as features that the customer does not want. The store clerk then makes recommendations based on the customer's responses.

The customer, however, sometimes has difficulty articulating the features that he or she likes, often realizing that a feature is to the customer's liking after the individual actually sees, feels, and/or experiences the feature embodied in a particular item. Thus, customers many times roam the store in hopes of finding items that suit their tastes. Customers might then select several of such items for a closer inspection prior to purchasing.

In a clothing retail facility, the customer actually tries on the selected items. Thus, a store clerk assisting the customer can keep track of the items being selected for fitting, and make general inferences about the features the customer desires. The store clerk may then make recommendations on similar, alternative, or additional merchandises that the customer might like.

The described method of customer assistance, especially in a clothing retail store environment, has several drawbacks. First, a store clerk must remember a customer's face and the items chosen by the customer, as well as the fitting room number in which he or she is trying on the items. If a store clerk is not able to remember such details, the clerk will write down the information on paper. However, having a paper and pen/pencil constantly at hand is an added burden to the store clerk.

Second, in a retail store where the number of salespeople is limited, one store clerk might have to assist more than one customer at a time. This provides additional stress to the store clerk's ability to match customers with the items selected and the fitting rooms being utilized. When the number of customers substantially outnumber the number of salespeople, some customers are ultimately left with inadequate, or no assistance at all.

Even if a store clerk becomes available to assist a customer currently being assisted by a first store clerk, no efficient method exists for the first store clerk to share information about the customer in the fitting room (e.g., information on the items that the customer has tried on so far). Consequently, the first store clerk cannot be efficiently replaced by another store clerk. Without such an efficient method of sharing information, shifting of store clerks becomes unproductive, especially when the first clerk has a significant amount of information to share, such as information about the customer's preferences, tastes, and shopping habits, that have been accumulated through regular dealings with the customer.

Another drawback to the above-described method of customer assistance is that the quality of the assistance is highly dependent on the store clerk's expertise and knowledge of items in the store. For instance, even the most experienced store clerk might at times forget that an item exists in the store that matches a customer's preference, resulting in a loss to both the customer and the retailer if the item would have been purchased by the customer had it been recommended by the store clerk.

Accordingly, there is a need for a system and method for tracking and recognizing merchandise items carried into a fitting room by a customer for further data processing. Such system should display the fitting room number being utilized by a particular customer on an in-store display terminal accessible to a store clerk. The system should further display information on the items being tried on, such as the number of such items, their style, brand, color, and price. In addition, the system should process the style, brand, color, and price data of the items in the fitting room, and provide recommendations of other items consistent with the analyzed data. When used in combination with a customer identification card, the recommendations provided by the system should also be consistent with the customer's profile information.

SUMMARY OF THE INVENTION

The present invention addresses and alleviates the above-mentioned deficiencies associated with the prior art. More particularly, the present invention comprises a system and method for recognizing and recommending items taken into a fitting room by a customer. Each item has an electronic tag for storing the item's product identifier such as a UPC code or product name. Each room has an interrogator unit so that when an item is taken into the fitting room and is placed in proximity to an interrogation area defined by the fitting room's interrogator unit, the interrogator unit receives the item's product identifier. A processor coupled to the interrogator unit uses the product identifier to retrieve product profile information about the item, and recommends other items based on this information.

In one particular aspect of the invention, the system recommends items based on the style of the item in the fitting room. The system also recommends alternative colors for the item, and provides promotional information and information on new products associated with the item's brand.

In another aspect of the invention, the system maintains a purchase and trial history data for each customer indicating the items that the customer has previously taken into a fitting room. The purchase and trial history data further indicates whether the item has been purchased or not. The purchase and trial history data may also identify a particular employee who assisted the customer with the item.

It will be appreciated, therefore, that the present invention allows store clerks can easily keep track of items being tried-on by the customers. The store clerks can also make real-time recommendations of additional or alternative items to a customer without having to maintain extensive hand written information or having to rely on his or her memory. This further allows one store clerk to efficiently assist more than one customer at a time. In addition, the clerks may be efficiently shifted from one customer to another without losing valuable information accumulated about the customer via observation of the items taken into the fitting room. The present system and method therefore helps bolster sales and increase customer satisfaction.

It will also be appreciated that the present invention allows a retailer to determine the popular items in the store based on the frequency of such items being taken into a fitting room. The retailer may use this information to place additional orders of the popular items. The retailer may also determine the type of customers or types of items a store clerk is most capable of handling. Based on this information, the retailer may also provide necessary training to a store clerk who is not producing sales in a particular area, or place the clerk in the position where he or she is most productive.

BRIEF DESCRIPTION OF THE DRAWINGS

These and other features, aspects and advantages of the present invention will be more fully understood when considered with respect to the following detailed description, appended claims and accompanying drawings wherein:

FIG. 4 is a schematic layout diagram of a Price Look-Up Table including information about the products sold in the retail facility;

FIG. 6 is a schematic layout diagram of a stock information database used by the recommendation engine of FIG. 5 for recommending items to the customer;

FIG. 9 is a schematic layout diagram of a customer's purchase and trial history data;

DETAILED DESCRIPTION OF THE INVENTION

In general terms, the present invention is directed to a particular system and method for acquiring recognition information of merchandise items taken into a fitting room of a retail facility by a customer. Each merchandise item is attached to a wireless tag including a product identifier, such as the product's Universal Product Code (UPC) or product name. As the customer takes an item into the fitting room, an antenna/receiver unit interrogates the wireless tag and transmits the product ID and the corresponding fitting room number to a store server for further processing.

The store server retrieves information about the product being carried into the fitting room and presents such information to a store clerk through an in-store terminal. Such in-store terminals include point-of-sale terminals, workstation terminals, mobile terminals, and the like.

In addition, the server develops recommendation of other products that the customer might be interested based upon the items taken into the fitting room. The server includes an analysis and recommendation engine that analyses the style, color, and brand of each of the items in the fitting room, and develops the recommendation information accordingly, as is described in further detail below. The server presents the recommendation information to a store clerk via the in-store terminal.

It will be appreciated, therefore, that the system and method according to the present invention provides a significant improvement in the quality and efficiency of customer assistance in a retail facility. A store clerk can make real-time recommendations of additional or alternative items to a customer without having to maintain extensive hand written information or having to rely on his or her memory. This further allows one store clerk to efficiently assist more than one customer at a time. In addition, the clerks may be efficiently shifted from one customer to another without losing valuable information accumulated about the customer via observation of the items taken into the fitting room. Information about the products in each fitting room, as well as the items recommended for each customer in the fitting rooms is provided to all the store clerks via the in-store terminals. The present system and method therefore helps bolster sales and increase customer satisfaction.

Figure 1:
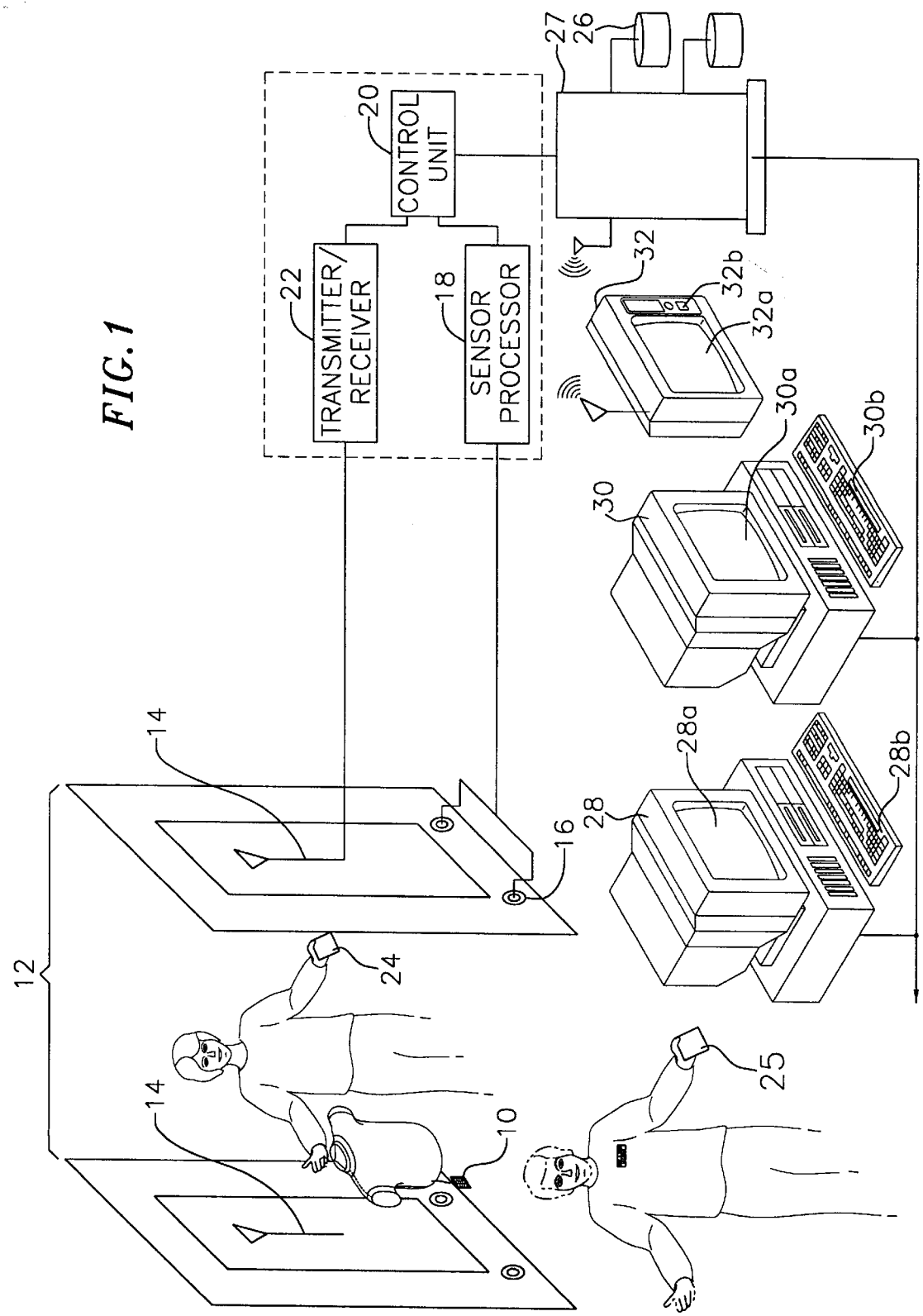
FIG. 1 is a schematic block diagram of an item recognition and recommendation system for use in a retail facility in accordance with the present invention.
Figure 2:
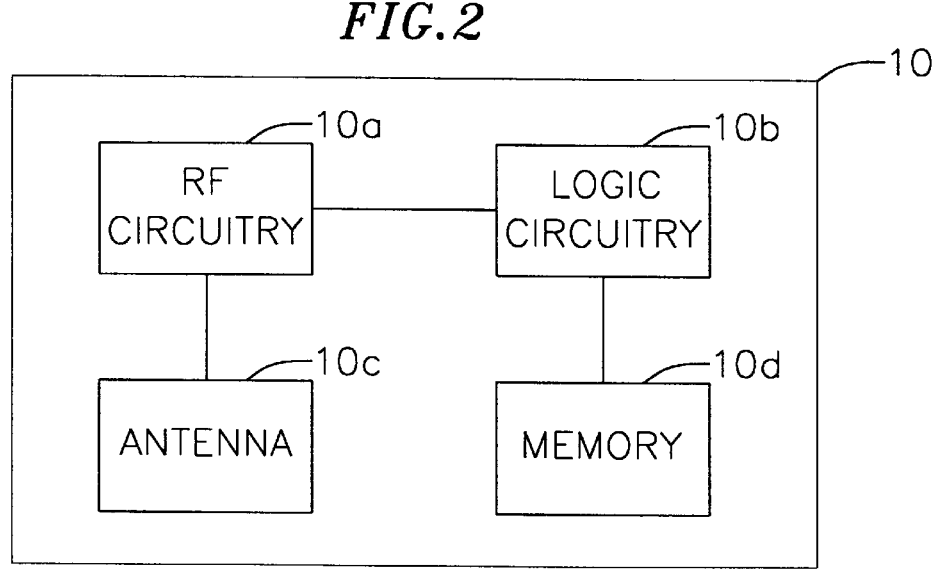
FIG. 2 is a schematic block diagram of an electronic wireless tag used in the system of FIG. 1.

Considering the foregoing, FIG. 1 depicts a schematic block diagram of an exemplary embodiment of a system for merchandise item recognition. In the exemplary embodiment of FIG. 1, merchandise recognition is supported through an electronic wireless tag 10 that is attached to an item sold within the retail facility. As illustrated in more detail in FIG. 2, the wireless tag 10 includes a semiconductor chip having RF circuitry 10a, logic circuitry 10b, antenna 10c, and memory 10d. The memory 10d encompasses an electronically erasable field-programmable read-only memory (EEPROM), a flash ROM (FROM), or other known memory device suitable for use in the electronic wireless tag 10. The memory 10d stores a unique product identification code (product ID) identifying the item that is attached to the tag 10. The product ID preferably takes the form of a UPC code.

The antenna 10c transmits product ID signals through the RF circuitry 10b in response to being interrogated or activated by an interrogator unit 14 located in or within a close proximity of a fitting room 12. According to one embodiment of the invention, the tag 10 is configured only with transmission circuitry for transmitting the product ID upon interrogation by the interrogator unit 14. In an alternative embodiment, the tag 10 is configured to support full two-way wireless communication with the interrogator unit 14.

The interrogator unit 14 takes the form of an RF antenna and is configured with an antenna identification code or number (antenna ID). In a manner well understood by those having skill in the art, the interrogator unit 14 interacts with the wireless tag 10 as a customer carrying an item with the wireless tag 10 enters the fitting room 12 and passes in proximity to an interrogation area defined by the interrogator unit 14. The interrogator unit 14 transmits an interrogation signal to the tag 10, causing the tag 10 to transmit the product ID stored in memory 10d in response to the interrogation signal.

The interrogator unit 14 packages all the product IDs received from all the tags 10 in the fitting room with its antenna ID, and directs the packaged information to a transmitter/receiver circuit 22. A single transmitter/receiver circuit 22 is used for communicating with all the interrogator units within the various fitting rooms. The unique antenna ID associated with each interrogator unit 14 allows the server to match each fitting room number with a particular antenna ID.

According to one embodiment of the invention, the interrogation sequence is fully automatic, with an interrogation signal being continuously issued by the interrogator unit 14. Alternatively, the interrogation sequence is initiated when a customer activates a sensor 16 disposed at an entrance/exit of the fitting room 12.

If the fitting room 12 is equipped with a sensor system, the sensor 16 is configured as a simple motion sensor. The sensor 16 might also be configured as an interruptible light beam, interruptible RF field, and the like. A customer carrying an item with the wireless tag 10 activates the sensor 16 upon entering the fitting room 12 and causes a sensor processor circuit 18 to issue a signal to a central control unit 20, such as a central processing unit, a microprocessor, or the like. The central control unit 20 in turn invokes the transmitter/receiver circuitry 22 to cause the interrogator unit 14 to issue an interrogation signal.

The customer entering the fitting room 12 may also carry a smart card-like identification card or tag (a customer ID card) 24. The customer ID card 24 suitably comprises a personal memory card or data card which looks and feels much like an ordinary credit card. The card 24 is able to at least transmit, and preferably transmit and receive, information without recourse to contacts or wires (i.e., through wireless transmission). The customer ID card 24 includes an RF receiver/transmitter which communicates customer ID signals and optional customer profile data in response to being interrogated or activated by the interrogator unit 14. The interrogator unit 14 transmits the customer ID and optional customer profile data to the transmitter/receiver circuit 22 which in turn relays the information to the control unit 20.

A store clerk assisting the customer may carry an employee card or tag (an employee ID card) 25 much like the customer ID card 24. When the employee carrying such a card 25 is in proximity to the interrogator unit 14, the employee's name or identification number (employee ID) is also transmitted to the transmitter/receiver circuit 22 which then directs it to the control unit 20.

Figure 3:
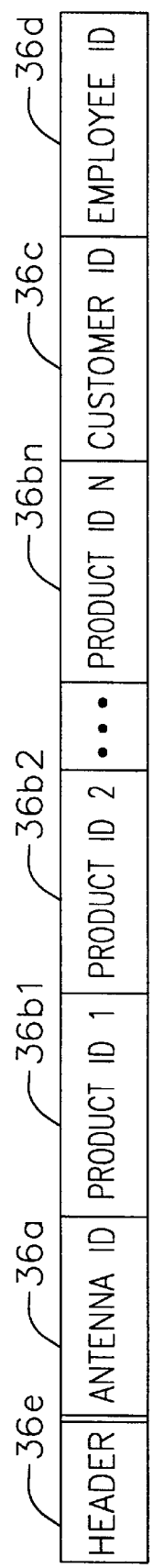
FIG. 3 is a schematic layout diagram of an exemplary fitting room merchandise data set.

The control unit 20 takes the antenna ID, one or more product IDs, customer ID, and/or employee ID, and bundles it as a fitting room merchandise data set. A semi-schematic layout diagram of one such exemplary dataset 36 is illustrated in FIG. 3. The dataset 36 is headed and identified by the antenna ID 36a. The antenna ID is followed by one or more blocks of data corresponding to the product IDs 36b1–36bn. The customer ID block 36c and employee ID block 36d may contain default ID's if no customer ID or employee ID has been provided. Otherwise, the customer ID block 36c and employee ID block 36d respectively store the customer ID and the employee ID.

In an alternative embodiment, the dataset 36 includes a header block 36e with information on the size of the dataset, the number of product IDs in the dataset, and whether a customer's ID and an employee ID have been provided. If the customer ID and/or employee ID have not been provided, the customer ID block 36c and/or employee ID block 36d are not included into the dataset.

The control unit 20 transmits the dataset 36 to a network server 27. The server 27 takes the data in the dataset 36 and translates the antenna ID in the antenna ID block 36a, product IDs from the product ID blocks 36b1–36bn, customer ID from the customer ID block 36c, and/or employee ID from the employee ID block 36d, to a fitting room number, product name, customer name, and/or employee name, respectively, using one or more conversion tables if necessary. The server 27 may further retrieve information about each product, such as the product's style, color, and size, from a product information table. The various tables are stored in a mass storage device 26 hosted by the server 27.

The server 27 organizes the converted data into a fitting room record. The fitting room record is transmitted to various types of sales and/or service assistance terminals (in-store terminals) 28–32 disposed throughout the retail facility. Such terminals include point-of-sale (POS) terminals 28, workstation terminals 30, and/or hand-held mobile terminals 32. The in-store terminals 28–32 are each equipped with a display 28a–32a suitable for displaying a fitting room record. Each display 28a–32a preferably comprises a VGA, SVGA liquid-crystal-display (LC) screen, an LED display screen, or any other suitable display apparatus. Pressure sensitive (touch screen) technology may be incorporated into the displays 28a–32a so that a store clerk may access the terminal by merely touching certain portions of the screen. Alternatively, a keyboard 28b–30b or a numeric or alphanumeric button or keypad arrangement 32b is provided in combination with each display 28a–32a to define an input device.

FIG. 4 is a schematic layout diagram of a product information table 180 for storing product information. The table 180 preferably comprises a set of merchandise specific information which might be arranged in a variety of ways, but is most advantageously configured as sequential entries, with each entry specific to a particular piece of merchandise. A particular merchandise entry includes a product ID field 180a including the product's UPC code. A Stock Keeping Unit (SKU) field 180b includes a store identifier that is identified to a particular product's UPC by a suitable conversion routine. A particular merchandise entry further includes a product name field 180c, typically implemented as a text string, that gives the brand and product name of the product. A style field 180d, color field 180e, and size field 180f identify a style (e.g. woman's skirt), color (e.g. black), and size (e.g. small), respectively, of the particular product. The style, color, and size fields 180a–f are implemented as numeric or text strings including a code, number, or indicia indicating the product's style, color, and size.

A description field 180 includes a text description of the product for providing further information about the product's attribute. A person skilled in the art should recognize that other product attributes may be stored in the PLU table 180, such as the price of the product, the number of products in stock, whether the product is on sale, and the like. Thus, the described categories in the product information table are exemplary, and not intended to be limiting in any sense.

Figure 5:
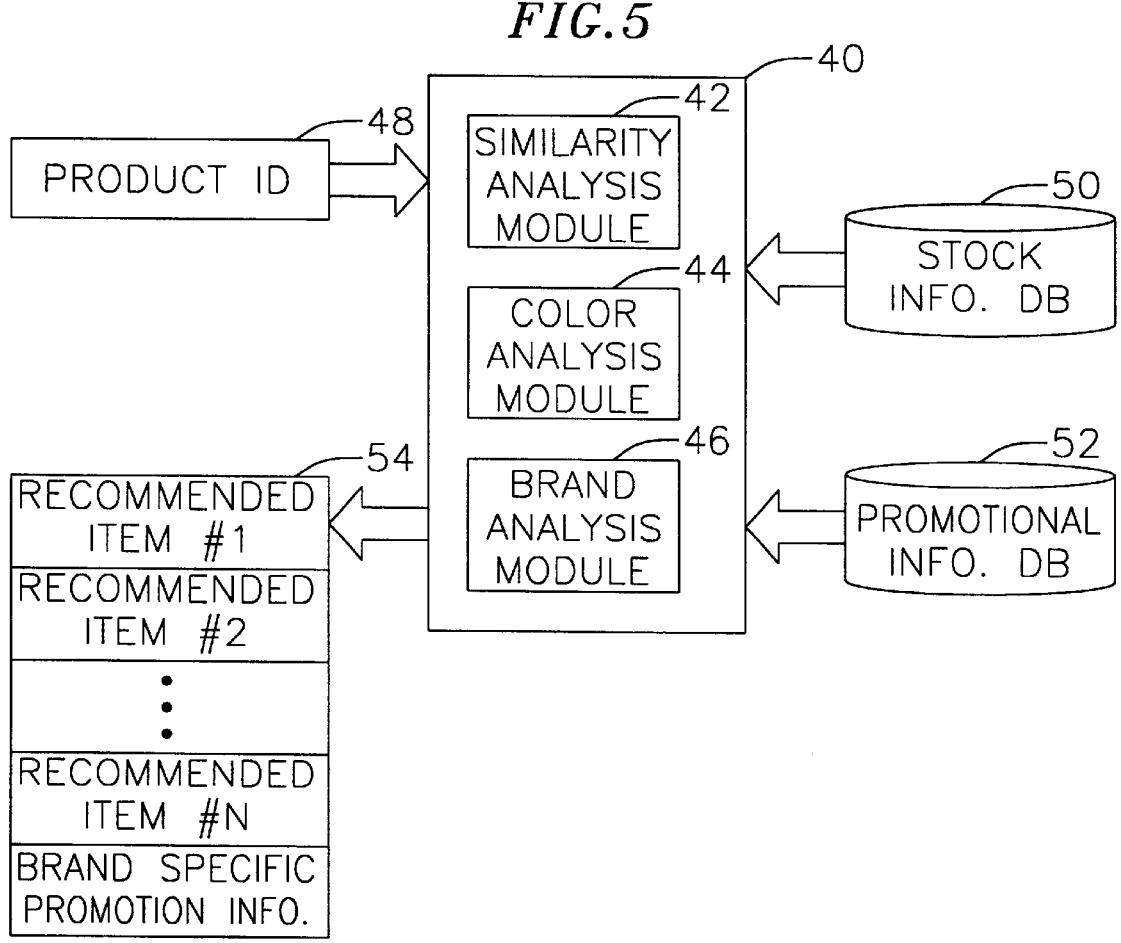
FIG. 5 is a functional block diagram of an analysis and recommendation engine used for recommending items to a customer.

FIG. 5 is a functional diagram of the analysis and recommendation (AR) engine 40 for recommending items to a customer based on the items taken into a fitting room 12. The AR engine 40 includes a similarity analysis module 42, a color analysis module 44, and a brand analysis module 46. The AR engine 40 takes a product ID 48 of each product in the fitting room 12 obtained from the fitting room dataset 36 (FIG. 3) and searches the PLU table 180 (FIG. 4) for information about each of the products.

Once an entry for a particular product ID is found in the PLU table 180, the AR engine 40 retrieves the product's SKU code, style, color, and size information. The retrieved information is used by the similarity, color, and brand analysis modules 42, 44, 46 for retrieving items to recommend from a stock information database 50 and a promotional information database 52 residing in the system's mass storage device 26 (FIG. 1). The recommended items may relate to products with a similar style as a product being tried-on by the customer, the color alternatives for the product being tried-on, and promotional and new product information related to a brand being tried-on. The recommended items are bundled into a recommendation record 54 and transmitted to the in-store terminals 28–32 as part of the fitting room record. Based on the recommendation information, store clerks can render advice customers in a more effective and efficient manner.

FIG. 6 is a schematic layout diagram detailing the organization of the stock information database 50 according to one embodiment of the invention. As illustrated here, products are categorized into broad categories 200a, 200b. Such broad categories 200a, 200b include women's apparel, men's apparel, and the like. The broad categories 200a, 200b are further divided into one or more sub-categories 202a, 202b for further categorizing the products. The sub-categories 202a, 202b, are in turn divided into more detailed sub-categories 204a, 204b, each detailed sub-category 204a, 204b being associated with a unique style code 206a, 206b. Each detailed sub-category 204a, 204b includes a series of SKU numbers (referenced generally at 208) of products belonging to the style code 206a, 206b identified for each detailed sub-category. Each SKU number 208 is further associated with the product's name 208a, price, 208b, and a list of color 208c and size 208d alternatives for the product.

Figure 7:
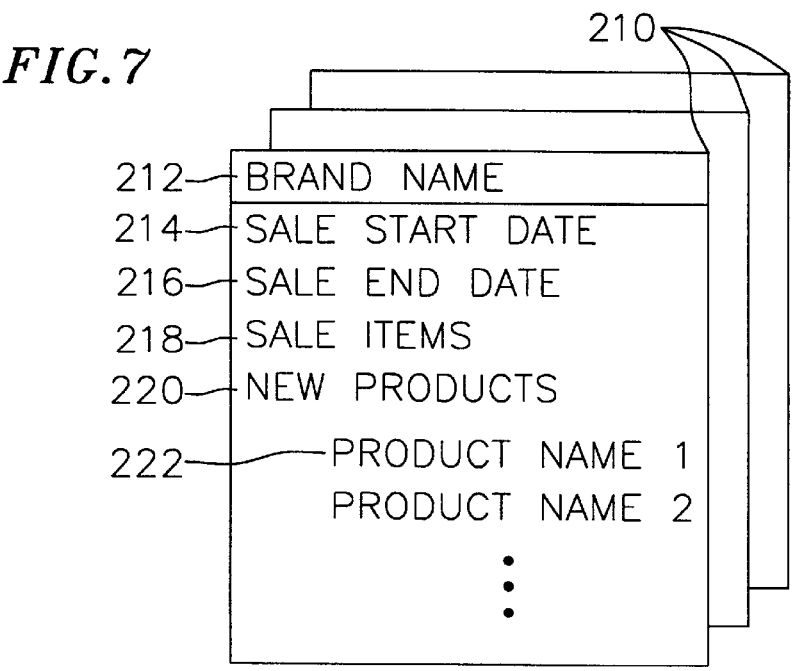
FIG. 7 is a schematic layout diagram of a promotional information database used by the recommendation engine of FIG. 5 for recommending items to the customer.

FIG. 7 is a schematic layout diagram of the promotional information database 52 according to one embodiment of the invention. The database 52 includes a series of brand-specific records 210, each record being headed and identified by a particular brandname 212. Each brand-specific record 210 includes a sale start date field 214 and a sale end date field 216 for indicating the time periods of a sale for the particular brand. The record further includes a sale items field 218 listing a series products belonging to the brand to be placed on sale. A new products field 220 lists a series of new products available for the brand listed by their SKU numbers 222. For instance, the new products field might indicate all the new products received for the current month.

The similarity analysis module 42 uses the style code retrieved for a product in the fitting room and searches the stock information database 50 for items with the same style information as the current product. In this regard, the similarity analysis module examines the style code 206a, 206b associated with each detailed sub-category 204a, 204b for a match with the current product's style code. Once a match is found, the similarity analysis module 42 retrieves the products listed under the detailed sub-category 204a, 204b, including the product's SKU number 208 and name 208a, as recommended items.

According to one embodiment of the invention, the products retrieved by the similarity analysis module are further reduced based on an analysis of a retrieved product's color, size, price, and other product criteria. For instance, the similarity analysis module 42 analyzes the color 208c alternatives of the retrieved products and eliminates products whose color alternatives do not correspond to the colors of the products in the fitting room. The similarity analysis module 42 also analyzes the price 208b and size 208d alternatives of retrieved products and eliminates products whose price and size alternatives do not correspond to the size and price-range of products in the fitting room.

The color analysis module 44 provides recommendation of products based on the color retrieved for a product in the fitting room. In this regard, the color analysis module 44 searches the stock information database 50 for the product's SKU 208. Once a match is made, the color analysis module 44 searches the color 208c alternatives for the product and submits it as part of the recommendation record 54.

The brand analysis module 46 provides recommendation of products based on the information retrieved about the brand from the promotional information database 52. The brand analysis module 46 searches the promotional information database 52 for the brandname of a product in the fitting room. In doing so, the brand analysis module 46 compares the brandname 212 of each brand-specific record 210 with the brandname of a product in the fitting room. If a match is made, the brand analysis module 46 retrieves any special promotional information or new product information corresponding brand, and bundles this information into the recommendation record 54.

Figure 8:
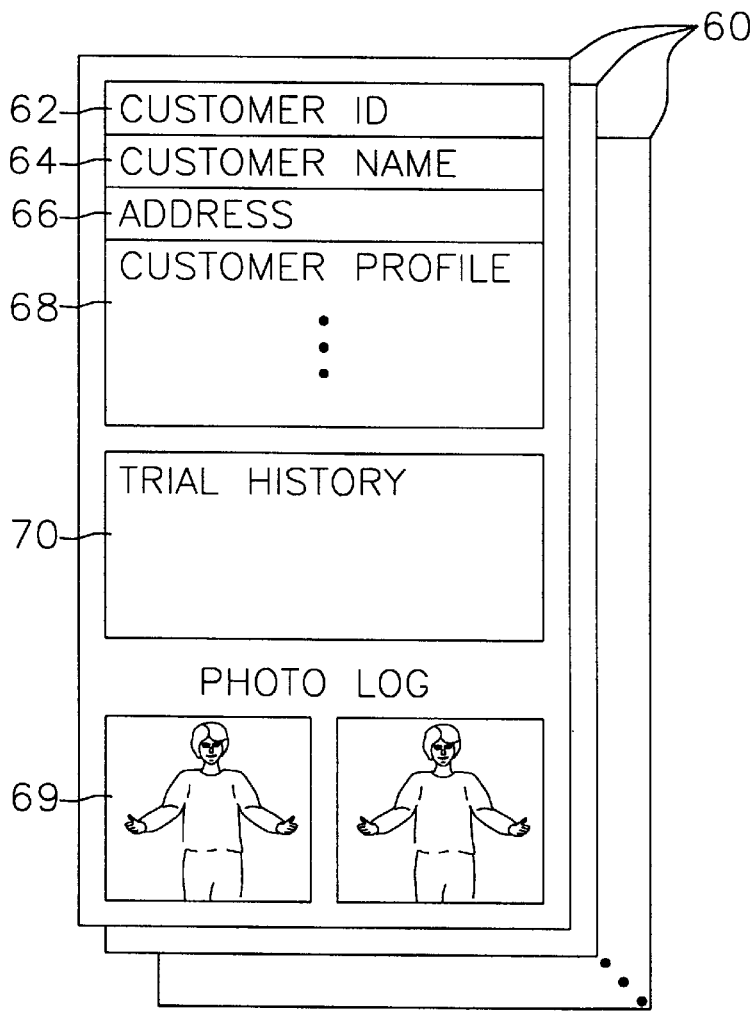
FIG. 8 is a schematic layout diagram of customer record in a client database.

In the event that a customer ID card 24 is used, the AR engine 40 utilizes the customer ID obtained from the card 24 to retrieve and analyze the customer's profile information to aid in the recommendation process. According to a one embodiment of the invention, customer profile information is stored in a client database resident in the system's mass storage unit 26. As illustrated in FIG. 8, the client database includes a series of customer specific records (identified generally at 60) each of which is headed and identified by a customer ID 62. Following the customer ID 62, each customer data record includes a customer name 64, address 66, including his or her e-mail address, and customer profile entry 68. The customer profile entry 68 includes demographic information relating to the customer's date-of-birth, family status, age, gender, and the like, as well as information relating to the customer's personal shopping preferences such as preferred brands, colors, patterns, sizes, etc. A videographic image 69 of the customer might also be included for display at the in-store terminals when assisting the customer.

In addition to the foregoing, each customer record 60 includes an information storage area containing the customer's purchase and trial history 70. As a customer takes an item into a fitting room to try-on, the system updates the purchase and trial history 70 area to reflect that the item was taken into the fitting room. The system also records the purchase of the item if this occurs.

FIG. 9 is a schematic layout diagram of a customer's purchase and trial history 70 data. A date and time field 72 indicates the date and time in which the customer visited the store and tried-on one or more items from the store. A fitting room number field 74 indicates the fitting room number utilized by the customer to try-on the items. A store clerk ID field 76 indicates the employee ID of the store clerk assisting the customer which is retrieved from the employee's ID card or tag 25 (FIG. 1). A product ID field 78 indicates the product IDs of an item the customer carried into the fitting for trying-on, and whether the product was purchased by the customer. A person skilled in the art should recognize that other information might be maintained in the information storage area. For instance, brand, style, and color information might also be associated with each product ID.

In making a recommendation, the AR engine 40 analyzes the customer's purchase and trial history 70 area to better determine the customer's tastes. According to one embodiment of the invention, the AR engine 40 uses a customer's purchase and trial history information to eliminate items from the recommendation record 54 if they have already been purchased or tried-on by the customer. However, if a product that the customer has tried-on in the past but has not purchased is on sale, the brand analysis module 46 retrieves the product for recommendation to the customer.

According to another embodiment of the invention, the AR engine 40 examines the customer's purchase and trial information for purchasing trends. For example, if the customer tries-on a particular style of clothing at particular times of the year (e.g. party dresses during the month of December), the similarity analysis module 42 recommends products belonging to the style during those times of the year.

In addition to the above, the server 27 maintains a product history database with information about each product's trial and purchase history information. The product history database is updated each time a product is taken into the fitting-room and/or purchased by a customer. In this way, the server 27 may monitor the attention a particular item in the store is receiving from the customers, and whether such items are being purchased.

Figure 11:
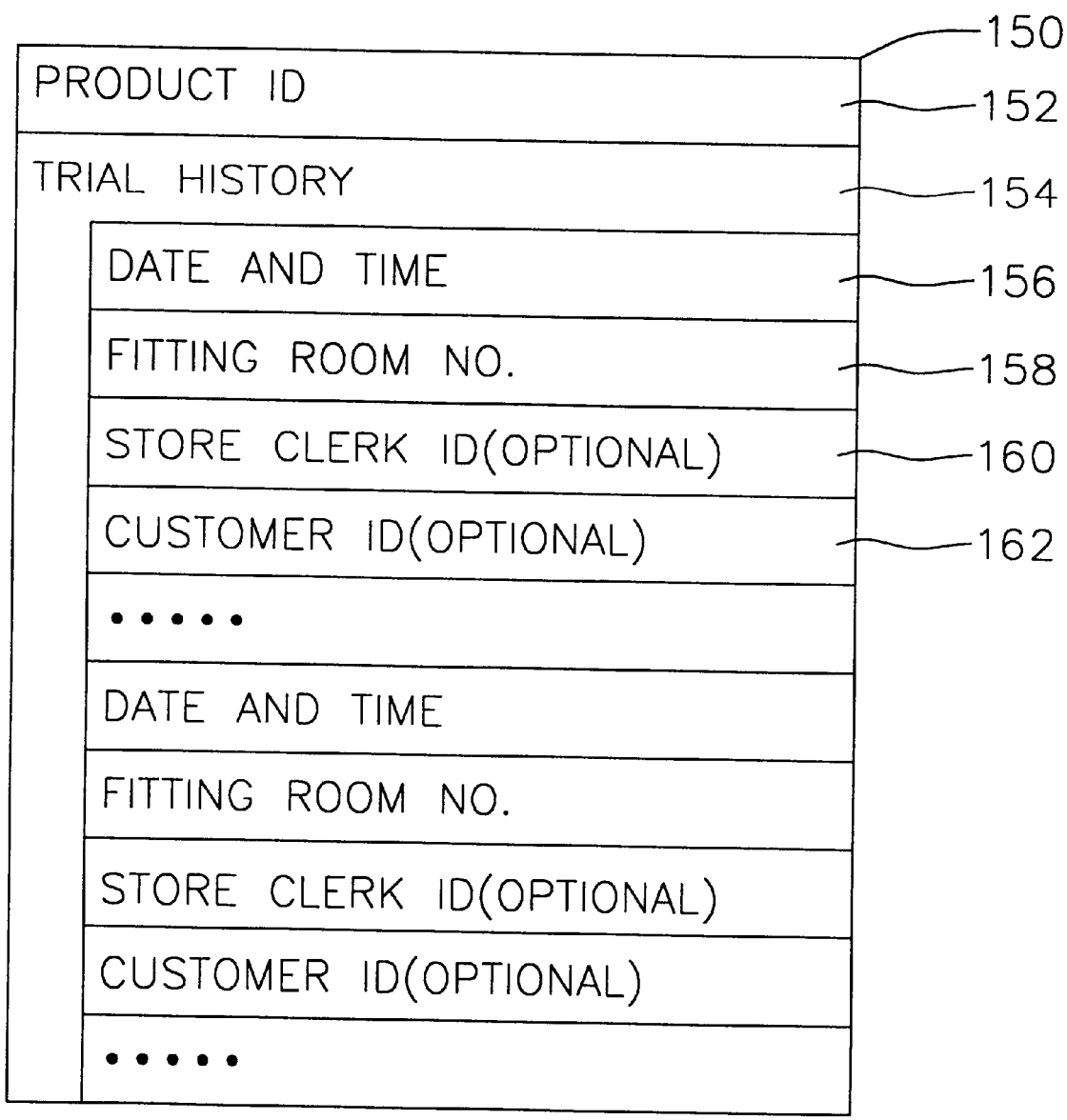
FIG. 11 is a schematic layout of a product's purchase and trial history data in a product history database.

As illustrated in FIG. 11, the product history database comprises a series of product specific records 150, each of which is headed and identified by a product ID 152. Following the product ID 152, each product data 150 record includes an information storage area that contains the product's purchase and trial history 154. The information storage area includes a sequence of information fields analogous to the information fields in the shopping and purchase history 70 (FIG. 9) area in a customer's record. For instance, a date and time field 156 indicates the date and time in which a customer tried-on the product identified by the product ID 152. A fitting room number field 158 indicates the fitting room number utilized by the customer to try-on the product. If the employee assisting the customer possessed an employee card or tag, a store clerk ID field 160 indicates the employee ID retrieved from the employee card or tag. Similarly, if the customer possessed a customer ID card, a customer field 162 indicates the customer ID retrieved from the card. A person skilled in the art should recognize that other information might be maintained in each product data record 150. For instance, brand, style, and color information might also be associated with each product ID 152.

Figure 10:
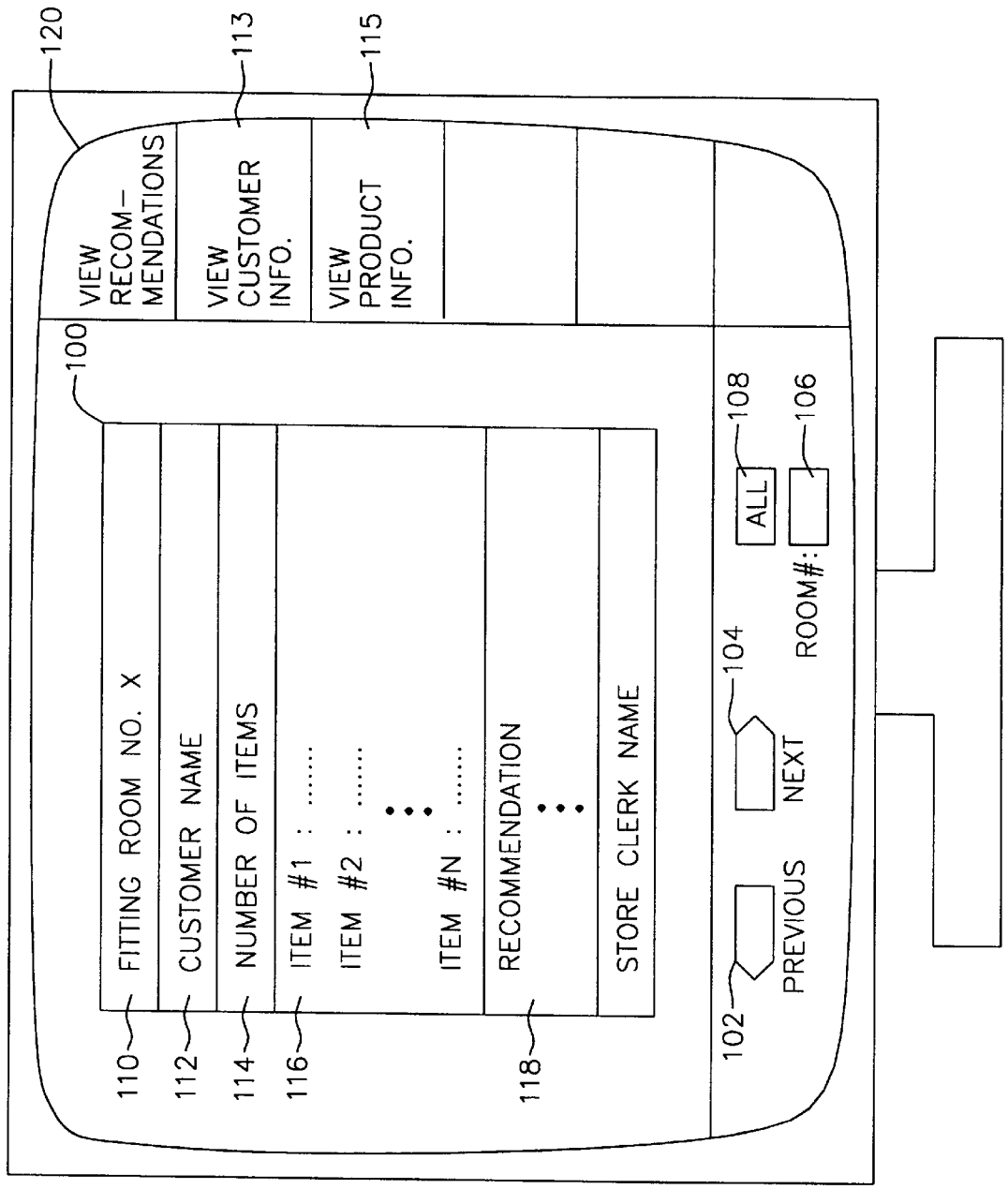
FIG. 10 is a screen display of a fitting room and recommendation information.

FIG. 10 is an exemplary screen for displaying on an in-store terminal 28–32, a fitting room record with information on the products being tried-on in a particular fitting room and recommendation information for the customer in the fitting room. As illustrated in FIG. 10, the server 27 presents the fitting room display records 100 on a fitting-room-by-fitting-room basis. A clerk may view information about a particular fitting room by selecting a previous button 102 or a next button 104 on the display, until the display record 100 of the desired fitting room appears. Alternatively, the clerk might enter the fitting room number in a fitting room entry area 106 to jump to the fitting room display record 100 for the entered fitting room number. Information on all the fitting rooms may also be displayed at a single time by selecting a view all button 108 from the display.

The server 27 displays a fitting room number 110 at the top of each display record 100. Following the fitting room number is the name 112 of the customer in the fitting room. The server 27 obtains the customer's name from the customer record 60 based on the customer ID stored in the customer ID card 24 carried by the customer as he or she enters the fitting room 12.

Additional information about the customer is also presented upon actuation of a view customer information button 113. Upon such selection, the server 27 displays the customer's profile information 68 (FIG. 5) such as the customer's birthdate, family status, age, gender, and the customer's personal shopping preferences such as preferred brands, colors, patterns, sizes, and the like. The server 27 also displays the customer's purchase and trial history 70 information. A videographic image 69 of the customer is also displayed if available from the customer's record 60.

Each fitting room display record 100 also includes the number of items 114 carried into the fitting room by the customer to be tried-on. This information is followed by an item information section 116 displaying details about such items that have been taken into the fitting room. The item information section 116 preferably includes the item's name and brand, style, size, color, price, and the like. In an alternative embodiment, the item information section is displayed only upon actuation of a view product information button 115.

Following the item information section is a recommendation section 118 displaying the items recommended by the AR engine for the customer, as well as brand-specific promotional information. In an alternative embodiment, the items recommended are displayed only upon the making of such a request to the AR engine. A store clerk makes a request for recommendation by actuation of a view recommendation button 120.

Accordingly, there has been brought to the art of electronic item tracking systems, a system and method for tracking and recognizing merchandise items carried into a fitting room by a customer. By tracking the items carried into a fitting room and displaying their information, as well as recommendation information on in-store terminals, information about the customers and items in the fitting rooms can be effectively maintained and shared with all store clerks. This allows store clerks to assist multiple customers at a time. Retailers can also schedule a store clerk's work shift without depending on the store clerk's expertise. This is especially true if the customer possesses a customer ID card which allows the system to maintain purchase and trial information on the customer. The purchase and trial information maintained for each customer as well as for each product in the retail store also allows the retailer to analyze which items are popular and should be re-stocked. Moreover, the purchase and trial information aids the retailer in its direct marketing activities for targeting customers with profiles who are likely to purchase a particular product.

The purchase and trial information associated with each product or customer further allows a retailer to determine the type of customers or types of items a store clerk is most capable of handling. This might be done by gathering data about the customers assisted by an employee and analyzing if the assistance resulted in a sale. Based on this information, the retailer might provide necessary training to the store clerk, or place the clerk in the position where he or she is most productive. For instance, if a store clerk was able to make a sale 90% of the time the clerk was assisting in the juniors department, but was only able to make a sale 40% of the time the clerk was assisting in the shoe department, the retailer might decide to place the clerk in the juniors department. Alternatively, the retailer might decide to provide training in the shoe sales area.

While the invention has been described with respect to particular illustrated embodiment, those skilled in the art and technology to which the invention pertains will have no difficulty devising variations which in no way depart from the invention. For example, while the illustrated embodiments have been described in connection with a store server system coupled to a local network, it will be appreciated that a distributed set of network servers could be employed to like effect and utility without departing from the present invention. In addition, the wireless communication between an electronic tag 10 and interrogator unit 14, or between and among the various components of the system, might be infrared as well as RF. In yet another example, recommendations performed by the similarity, color, and brand analysis modules 42, 44, 46 may be based on a plurality of products instead of a single product at a time. Accordingly, the present invention is not limited to the specific embodiments described above, but rather as defined by the scope of the appended claims and their equivalents.

What is claimed is:

1. An item recognition and recommendation system comprising:
   an electronic tag coupled to a first item, the electronic tag including a memory storing a product identifier corresponding to the first item;
   an interrogator unit positioned within a room, the interrogator unit defining an interrogation area and receiving the product identifier from the electronic tag when the electronic tag is in proximity to the interrogation area;
   a processor coupled to the interrogator unit, the processor maintaining track of items taken into the room, the processor further retrieving product profile data of the first item based on the product identifier and recommending a second item based on the retrieved product profile data.

2. The system of claim 1 further comprising a terminal unit in communication with the processor, the terminal unit displaying the product profile data on a display screen.

3. The system of claim 1 further comprising a terminal unit in communication with the processor, the terminal unit displaying the second item on a display screen.

4. The system of claim 1 further comprising a portable customer ID card including a memory storage area for storing a customer identifier, the customer identifier for being received by the interrogator unit when the customer ID card is in proximity to the interrogation, the customer identifier further being used by the processor to retrieve a customer profile data for recommending the second item based on the customer profile data.

5. The system of claim 4, wherein the customer profile data includes a purchase and trial history data indicating items that the customer has previously taken into a particular room and further indicating whether any of the items have been purchased by the customer.

6. The system of claim 5, wherein the purchase and trial history data further identifies an employee who assisted the customer with an item taken into the particular room.

7. The system of claim 1, wherein the product profile dataL includes style, brand, color, size, and price data of the item.

8. The system of claim 1 further comprising a product history database coupled to the processor for storing information about the first item including information about a customer who carried the first item and whether the customer purchased the item.

9. The system of claim 1 further including a sensor for identifying the presence of a customer as the customer enters the room, the sensor activating the interrogator unit when the customer is identified as being present in the room.

10. An item recognition system for recognizing an item taken into a room by a customer, the system comprising:
    an electronic tag coupled to the item, the electronic tag including a memory for storing a product identifier corresponding to the item;
    an interrogator unit positioned within the room, the interrogator unit defining an interrogation area and receiving the product identifier from the electronic tag when the electronic tag is in proximity to the interrogation area;
    a processor coupled to the interrogator unit, the processor maintaining track of items taken into the room, the processor further retrieving product profile data of the item based on the product identifier; and
    a terminal unit in communication with the processor, the terminal unit displaying the product profile data on a display screen.

11. The system of claim 10, wherein the terminal unit is a hand-held mobile terminal.

12. The system of claim 10, wherein the product profile data includes style, brand, color, size, and price data of the item.

13. The system of claim 10, wherein the processor recommends a second item to the customer based on the retrieved product profile data.

14. The system of claim 13 further comprising a portable customer ID card including a memory storage area for storing a customer identifier, the customer identifier for being received by the interrogator unit when the customer ID card is in proximity to the interrogation area and for being used by the processor for retrieving a customer profile data, the customer profile data being used by the processor for recommending the second item to the customer.

15. The system of claim 14, wherein the customer profile data includes a purchase and trial history data indicating items that the customer has previously taken into a particular room and further indicating whether any of the items have been purchased by the customer.

16. In an item recognition and recommendation system having an interrogator unit positioned within a room for recognizing an item taken into the room, the recognized item being associated with a style code, color information, and brand information, a network server in communication with the interrogator unit including:
    a stock information database for storing product information including a style code and color alternatives for a plurality of products;
    a promotional information database for storing information on promotional and newly received products for a plurality of brands;
    a client database including a customer purchase and trial history information of items taken into the room in past or present shopping trips;
    a similarity analysis module in communication with the stock information database for recommending a first set of items based on the recognized item's style code;
    a color analysis module in communication with the stock information database for recommending alternative colors based on the recognized item's color information; and
    a brand analysis module in communication with the promotional information database for recommending a second set of items based on the recognized item's brand information.

17. The network server of claim 16, wherein the similarity, color, and brand analysis modules use the customer purchase and trial history information for their recommendation.

18. The network server of claim 17 further comprising a product history database for storing information about the recognized item including information about a customer who carried the item into the particular room and whether the customer purchased the item.

19. The network server of claim 16 further comprising means for communicating the recommended items and colors to a terminal unit for display thereon.

20. A method for automatically recognizing and recommending items, the method comprising:

interrogating an electronic tag for obtaining a product identifier corresponding to a first item when a customer carries the first item into a room;

maintaining track of items taken into the room;

transmitting the product identifier to a control unit;

retrieving a product profile data of the first item based on the product identifier; and recommending a second item based on the retrieved product profile data.

21. The method of claim 20 further comprising transmitting the product profile data to a terminal unit for display thereon.

22. The method of claim 20 further comprising transmitting the second item to a terminal unit for display thereon.

23. The method of claim 20 further comprising retrieving a customer profile data of the customer and using the customer profile data for recommending the second item.

24. The method of claim 23, wherein the customer profile data includes a purchase and trial history data indicating items that the customer has previously taken into a particular room and further indicating whether any of the items have been purchased by the customer.

25. The method of claim 24, wherein the purchase and trial history data further identifies an employee who assisted the customer with an item taken into the particular room.

26. The method of claim 20, wherein the product profile data includes style, brand, color, size, and price data of the item.

27. The method of claim 20 further comprising storing information about the first item including information about the customer who carried the first item and whether the customer purchased the item.

28. The method of claim 20 further comprising identifying the presence of the customer as the customer enters the room and interrogating the electronic tag when the customer is identified as being present in the room.

29. A method for automatically recognizing an item taken into a room by a customer, the method comprising:

interrogating an electronic tag for obtaining a product identifier corresponding to the item when the customer carries the item into a fitting room;

maintaining track of items taken into the room;

transmitting the product identifier to a control unit;

retrieving a product profile data of the item based on the product identifier; and displaying the product profile data on a display screen.

30. The method of claim 29, wherein the product profile data includes style, brand, color, size, and price data of the item.

31. The method of claim 29 further comprising recommending a second item to the customer based on the retrieved product profile data.

32. The method of claim 31 further comprising the step of retrieving a customer profile data of the customer and using the customer profile data for recommending the second item.

33. The method of claim 32, wherein the customer profile data includes a purchase and trial history data indicating items that the customer has previously taken into a particular room and further indicating whether any of the items have been purchased by the customer.

34. In an item recognition and recommendation system having an interrogator unit positioned within a room for recognizing an item taken into the room, a method for recommending other items based on the recognized item, the method comprising:

storing product information for a plurality of products in a stock information database, the product information including a style code and color alternatives for each product;

storing promotional information and new product information for a plurality of brands in a promotional information database;

storing customer purchase and trial history information in a client database indicative of items taken into the room in past or present shopping trips;

retrieving a style code for the recognized item;

recommending a first set of items from the stock information database based on the retrieved style code;

retrieving color information for the recognized item;

recommending alternative colors from the stock information database based on the retrieved color information;

retrieving brand information for the recognized item;

recommending a second set of items from the promotional information database based on the retrieved brand information.

35. The method of claim 34, wherein all recommendations are further based on the customer purchase and trial history information.

36. The method of claim 34 further comprising a product history database storing information about recognized item including information about a customer who carried the item into the particular room and whether the customer purchased the item.

37. The method of claim 34 further comprising communicating the recommended items and colors to a terminal unit for display thereon.

38. An item recognition and recommendation system comprising:

an electronic tag coupled to a first item, the electronic tag including a memory storing a product identifier corresponding to the first item;

an interrogator unit positioned within a room, the interrogator unit defining an interrogation area and receiving the product identifier from the electronic tag when the electronic tag is in proximity to the interrogation area;

a processor coupled to the interrogator unit, the processor maintaining track of items taken into the room, the processor further retrieving product profile data of the first item based on the product identifier, recommending a second item based on the retrieved product profile data, and transmitting the product profile data of the first item and the recommended second item for use by a store employee in providing customer assistance.

39. An item recognition and recommendation system comprising:

an electronic tag coupled to a first item, the electronic tag including a memory storing a product identifier corresponding to the first item;

an interrogator unit positioned within a room, the interrogator unit defining an interrogation area and receiving the product identifier from the electronic tag when the electronic tag is in proximity to the interrogation area;

a client database including a customer purchase and trial history information of items taken into the room in past or present shopping trips;

a processor coupled to the interrogator unit and the client database, the processor retrieving product profile data of the first item based on the product identifier, adding the product profile data to the customer purchase and trial history information, and recommending a second item based on the customer purchase and trial history information.

* * * * *

UNITED STATES PATENT AND TRADEMARK OFFICE
CERTIFICATE OF CORRECTION

PATENT NO. : 6,313,745 B1
DATED : November 6, 2001
INVENTOR(S) : Hikaru Suzuki

It is certified that error appears in the above-identified patent and that said Letters Patent is hereby corrected as shown below:

<u>Title page,</u>
Item [57], ABSTRACT,
Line 6, replace "interruates" with -- interrogates --.
Line 12, after "interested" insert -- in --.

<u>Column 1,</u>
Line 36, replace "merchandises" with -- merchandise --.

<u>Column 2,</u>
Line 54, replace "can easily" with -- to easily --.
Line 55, replace "tried-on" with -- tried on --.

<u>Column 3,</u>
Line 64, after "interested" insert -- in --.

<u>Column 5,</u>
Line 51, replace "block 36d respectively" with -- block 36d, respectively, --.
Line 59, replace "into" with -- in --.

<u>Column 7,</u>
Lines 2, 3 and 4, replace "tried-on" with -- tried on -- (all occurrences).
Line 8, before "customers" insert -- to --.
Line 36, replace "series products" with -- series product --.
Line 37, replace "A new products" with -- A new product --.

<u>Column 8,</u>
Line 19, replace "to a one" with -- to one --.
Lines 46 and 65, replace "tried-on" with -- tried on --
Line 52, after "fitting" insert -- room --.
Line 53, replace "trying-on" with -- trying on --.

<u>Column 9,</u>
Line 4, replace "tries-on" with -- tries on --.
Lines 28 and 42, replace "tried-on" with -- tried on --.
Line 30, replace "try-on" with -- try on --.

UNITED STATES PATENT AND TRADEMARK OFFICE
CERTIFICATE OF CORRECTION

PATENT NO. : 6,313,745 B1
DATED : November 6, 2001
INVENTOR(S) : Hikaru Suzuki

It is certified that error appears in the above-identified patent and that said Letters Patent is hereby corrected as shown below:

<u>Column 10,</u>
Line 7, replace "tried-on" with -- tried on --.
Line 40, replace "re-stocked" with -- restocked --.
Line 60, replace "embodiment" with -- embodiments --.

<u>Column 11,</u>
Line 51, replace "dataL" with -- data --.

Signed and Sealed this

Twenty-eighth Day of January, 2003

JAMES E. ROGAN
*Director of the United States Patent and Trademark Office*